Sept. 3, 1968 W. H. KORTE 3,399,612
CAMERA MOUNT FOR OPTICAL INSTRUMENTS
Filed Dec. 6, 1965 3 Sheets-Sheet 1

INVENTOR.
WILLARD H. KORTE
BY
ATTORNEY.

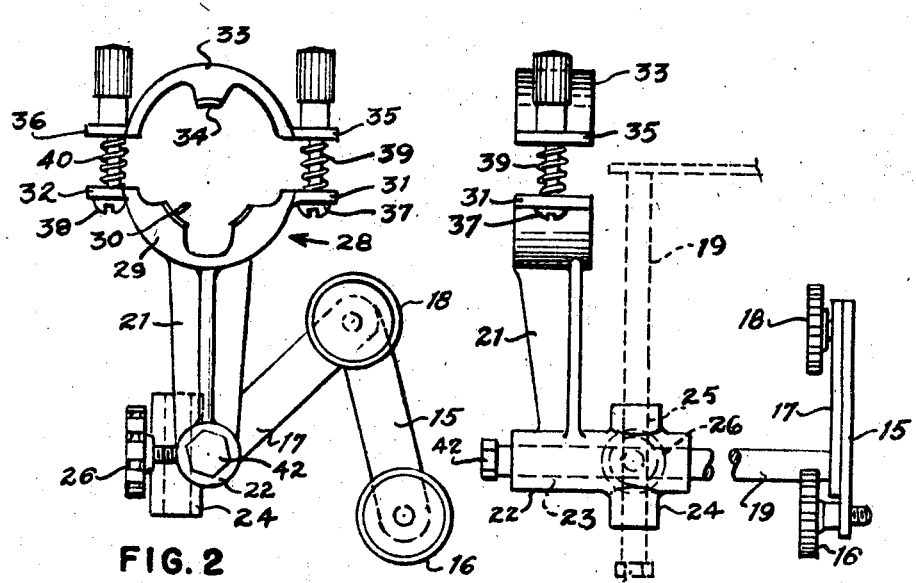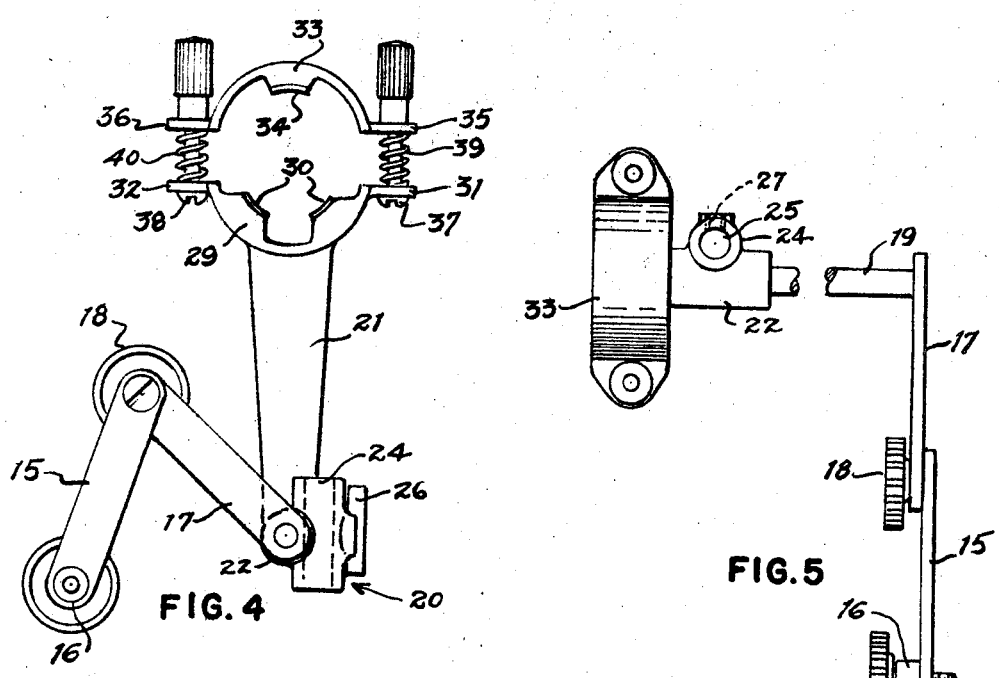

Sept. 3, 1968 W. H. KORTE 3,399,612
CAMERA MOUNT FOR OPTICAL INSTRUMENTS
Filed Dec. 6, 1965 3 Sheets-Sheet 3

INVENTOR.
WILLARD H. KORTE
BY
ATTORNEY

United States Patent Office 3,399,612
Patented Sept. 3, 1968

3,399,612
CAMERA MOUNT FOR OPTICAL INSTRUMENTS
Willard H. Korte, North Miami Beach, Fla., assignor to Tasco Sales, Inc., Miami, Fla., a corporation of Florida
Filed Dec. 6, 1965, Ser. No. 511,791
2 Claims. (Cl. 95—12)

ABSTRACT OF THE DISCLOSURE

A camera mount for optical instruments is shown which includes an instrument support, a camera support and a coupler therebetween. The instrument support includes an upper member having an arcuate portion thereupon and a pair of lateral ear portions each provided with a recess therewithin; a lower member is adjacent to the upper member having an arcuate portion of reverse curvature to that of the upper member and a pair of opposite lateral ear portions each provided with a recess therewithin registerable with the first-named recesses of the upper member. A screw is disposed within each pair of mating recesses and a spring and nut are disposed upon each of the screws. The camera support includes a first member with a screw portion carried thereupon adapted to be connected to a camera. A second member is pivotally connected to the first member by a screw which may also fixedly position the members with respect to one another. The coupler includes a rod connected to the second member of the camera support. The rod has a threaded end portion to which a cap screw may be selectively applied. A T-shaped portion is connected to the lower member of the instrument support and is provided with a transverse recess and a longitudinal recess which are substantially perpendicular to one another. A laterally disposed threaded opening is provided adjacent to and communicating with each of the recesses. A screw is selectively disposable within each of the threaded portions to secure the rod in position within the respective recess.

DESCRIPTION OF THE INVENTION

This invention relates to a camera mount and is particularly designed to provide a camera mount for telescopes and the like.

In many cases an observer utilizing an astronomical telescope desires to fit a camera to a telescope in order to photograph his observations. Similarly observers desire, in many cases, to fix cameras to microscopes for the same reason.

In mounting a camera in adjacent position to a telescope it is important that the camera be fixedly positioned adjacent the eyepiece lens of the device. However cameras are, necessarily, of different sizes and provision must be made to adjustably fit various types of cameras to the telescope or microscope.

In addition, in connection with telescopes, two types of such telescopes are generally encountered namely the reflecting and the refracting types. The positioning of the camera with respect to the reflecting type of telescope is not the same as the position of the same camera with the refracting type of telescope.

The camera mount of this invention is simple and inexpensive to manufacture. This camera mount may be easily adjusted to fit any type of telescope or microscope. Means are also provided so that the same camera mount can be utilized either for attachment to a reflecting or to a refracting type of telescope.

The foregoing sets forth a brief description of the instant invention and some of the objects and advantages thereof. Other objects and advantages of this invention will become apparent to the reader of this specification as the description proceeds.

The invention will now be further described by reference to the accompanying drawings which are made a part of this specification.

FIG. 2 is a detail end elevational view of a portion of the camera mount of this invention.

FIG. 3 is a detail side elevational view showing the rod member of the camera mount of this invention in the position that it normally assumes when a refracting telescope is utilized in connection with the mount and with the alternative position of the rod member utilized when a reflecting telescope is used in connection with the camera mount shown in phantom lines.

FIG. 4 is an opposite end elevational view of the view shown in FIG. 2.

FIG. 5 is a detail top plan view of portions of the camera mount of this invention.

Figure 1:
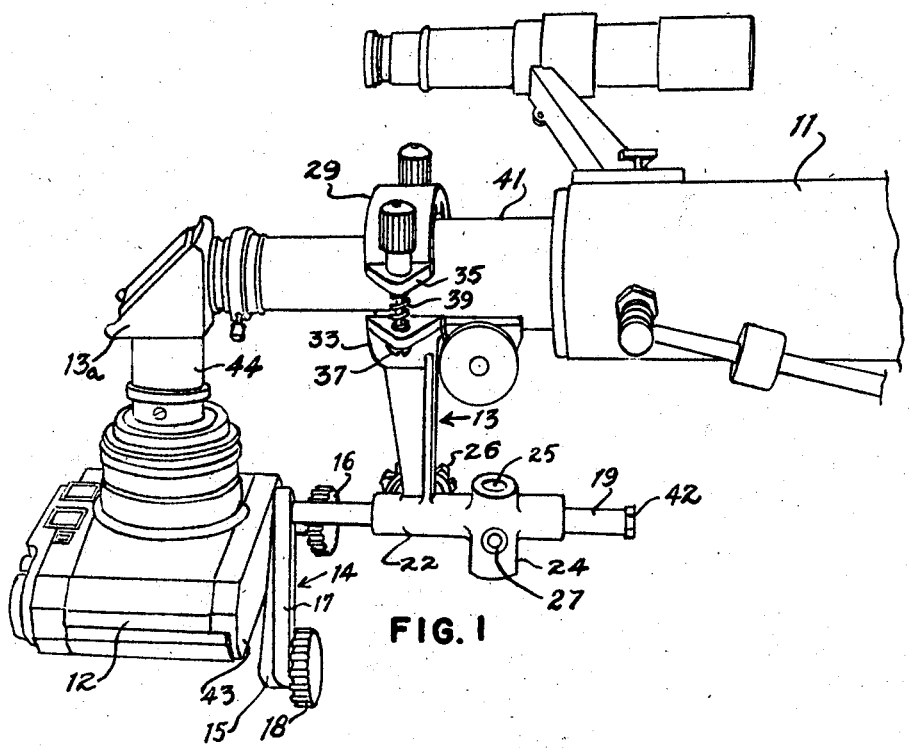
FIG. 1 is a perspective view of the camera mount of this invention attached to a refracting telescope.

The invention will now be further described in detail by specific reference to the form thereof shown in the accompanying drawings. In this connection, however, the reader is cautioned to note that the specific form of the invention shown in said drawings is for illustrative purposes and for purposes of example only. Various changes and modifications could obviously be made within the spirit and scope of this invention and would occur to those skilled in this art.

Now referring to the drawings in detail a telescope 11 (of the refracting type) is to be utilized in connection with a camera 12. In this case a prismatic adapting means 13a must also be utilized between camera 12 and telescope 11. Connector 13 is conventional and forms no part of this invention.

The camera mount 13 of this invention is formed with camera support means 14. Camera support means 14 are composed of a first holding element 15 having a screw portion 16 thereupon which is adapted to be secured to camera 12. A second holding element 17 is pivotally connected to element 15 by screw 18. Tightening of screw 18 will fixedly position member 17 to member 15. Secured to member 17 is rod 19 which is a portion of coupling means 20. Coupling means 20 also include a support 21 having a T-shaped lower portion 22. A longitudinal recess 23 is provided within portion 22.

A transverse T-shaped portion 24 is perpendicular to portion 22 and is provided with a recess 25 therethrough. Recess 25 is perpendicular to recess 23. A screw member 26 is also provided upon T-shaped portion 22 and communicates with recess 23. An additional threaded portion 27 is also provided within portion 22 so that screw 26 can be selectively moved from one position to another.

Telescope support means 28 comprise a first member 29 which is secured to support 21. Member 29 is formed with a first arcuate portion 30 thereupon and a plurality of outwardly projecting ear portions 31 and 32. A second member 33 is provided above member 29 and is formed with a second arcuate portion 34 of reverse curvature to portion 30. Member 33 is also formed with a pair of outwardly extending ear portions 35 and 36. A screw member 37 joins portions 31 and 35 to one another and an additional screw member 38 joins portions 32 and 36 to one another. In order to cause members 29 and 33 to be biased outwardly springs 39 and 40 are provided.

With the foregoing specific description the operation of this invention may now be explained.

Assuming that the camera mount of this invention is to be attached to a refracting telescope then member 33 is removed from position about member 29 and is then re-secured embraceably about the eyepiece tube 41 of telescope 11. Screws 37 and 38 are then tightened so that the mount is fixedly positioned to tube 41. Cap screw 42 is removed from the end portion of rod 19 and rod 19 is now slid into recess 23. Cap screw 42 is now replaced to prevent the parts from becoming disengaged. Screw 16 is now secured to the base plate 43 of camera 12. Camera 12 is then brought into juxtaposition with portion 44 of adapter 13 and is fixed into position. Screws 18 and 26 are now tightened so that the camera, telescope and mount are rigidly positioned in place.

Figure 6:
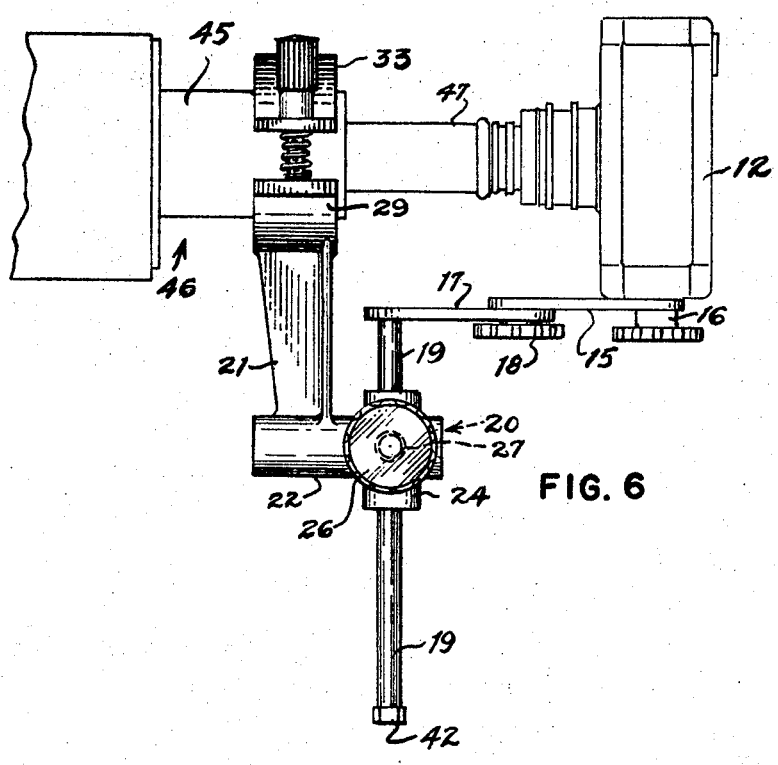
FIG. 6 is a view similar to that of FIG. 1 but showing the camera mount supporting a camera placed in position upon a reflecting telescope.

If it is desired to utilize the camera mount of this invention in connection with a reflecting telescope then members 29 and 33 are tightened about tube 45 of reflecting telescope 46 as shown in FIG. 6. Cap screw 42 is removed from rod 19 and rod 19 inserted into recess 25. Cap screw 42 is now replaced and screw 26 is now moved to threaded portion 27. The adapter 13 is not utilized in connection with this type of telescope since camera 12 can be put directly adjacent eyepiece 47 of telescope 46. The remaining steps necessary to secure the mount in position are the same as previously set forth.

The foregoing sets forth the manner in which the objects of this invention are achieved.

I claim:

1. A camera mount for optical instruments comprising instrument support means, camera support means and intervening coupling means, said instrument support means comprising a first member having a first arcuate portion thereupon and provided with a pair of opposite lateral ear portions each provided with a recess therewithin and a second member adjacent to but spaced from said first member having a second arcuate portion thereupon of reverse curvature to said first arcuate portion, said second member also having a pair of opposite lateral ear portions each provided with a recess therewithin and registerable with the corresponding recesses within the ear portions of said first member, a first screw member within each of said pairs of mating recesses, a spring member upon each of said screw members and a nut member secured to each of said screw members; said camera support means comprising a first holding element having a screw portion thereupon adapted to be secured to a camera, a second holding element pivotally connected to said first holding element, and means for fixedly positioning said first element to said second element; said intervening coupling means including a T-shaped portion secured to said second member of said instrument support means and provided with a longitudinal recess and a transverse recess, said recesses communicating with and being substantially perpendicular to one another, a rod member having a threaded end portion selectively securable and positionable within each of said recesses, a cap screw selectively disposable about said threaded end portion of said rod member, a lateral threaded portion adjacent to and communicating with each of said recesses, and a second screw member selectively disposable within each of said lateral threaded portions, said screw member adapted to secure said rod in position within one of said recesses.

2. A camera mount for optical instruments comprising instrument support means, camera support means and intervening coupling means, said coupling means including a substantially T-shaped support portion secured to said instrument support means, said support portion having a receptacle element provided with a transverse recess and a perpendicularly disposed longitudinal recess and with a laterally disposed opening communicating with each of the recesses, a holding member secured to said camera support means comprising a rod having a threaded portion at the end thereof and a cap screw selectively disposable about said threaded portion, said rod being selectively disposable within each of the recesses and means within each of the laterally disposed threaded openings adapted to selectively secure said rod in position.

References Cited

UNITED STATES PATENTS 3,055,283   9/1962   Suzuki _____ 95—86

FOREIGN PATENTS 313,185   5/1956   Switzerland.

JOHN M. HORAN, *Primary Examiner.*